United States Patent [19]
Cherico

[11] 3,824,536
[45] July 16, 1974

[54] WHEEL BLOCKING ALARM AND INDICATING SYSTEM

[76] Inventor: John R. Cherico, 508 Breckenridge St., Buffalo, N.Y. 14213

[22] Filed: May 1, 1972

[21] Appl. No.: 249,387

[52] U.S. Cl............. 340/52 R, 180/100, 200/85 R, 340/280, 340/282
[51] Int. Cl............................................ B60q 7/00
[58] Field of Search.......... 340/52 R, 272, 280, 282, 340/283, 421, 61, 70, 274; 200/85 T; 180/114, 82 R, 100, 114; 116/33

[56] References Cited
UNITED STATES PATENTS
594,678   11/1897   Clarke .............................. 340/283
991,219   5/1911   Maynard............................ 340/274

*Primary Examiner*—John W. Caldwell
*Assistant Examiner*—Joseph E. Nowicki
*Attorney, Agent, or Firm*—Christel & Bean

[57] ABSTRACT

A wheel blocking alarm and indicating system comprising a blocking member adapted to be placed in blocking engagement with a vehicle wheel, first sensing means in the form of switching means on the blocking member adapted to be contacted and operated by the wheel, and electrically operated indicating means connected to the switching means for providing an alarm indication when the blocking member is not placed in blocking engagement against the wheel and for providing an indication of safety when the switching means is operated when the blocking member is placed in blocking engagement against the wheel. The indicating means can be located remote from the blocking member such as inside a loading dock for wheeled freight carriers. A second sensing means in the form of switching means is provided on the blocking member and is connected to the indicating means to provide an alarm indication when the blocking member is not received in a storage means provided separate from the blocking member and when the blocking member is not placed in blocking engagement against the wheel.

11 Claims, 9 Drawing Figures

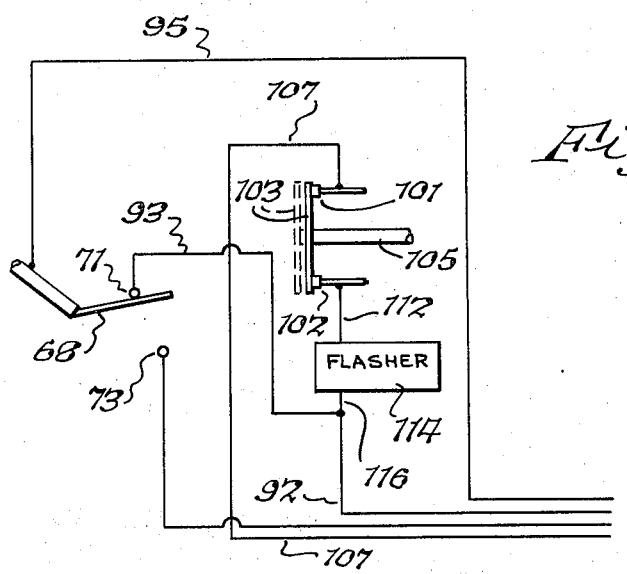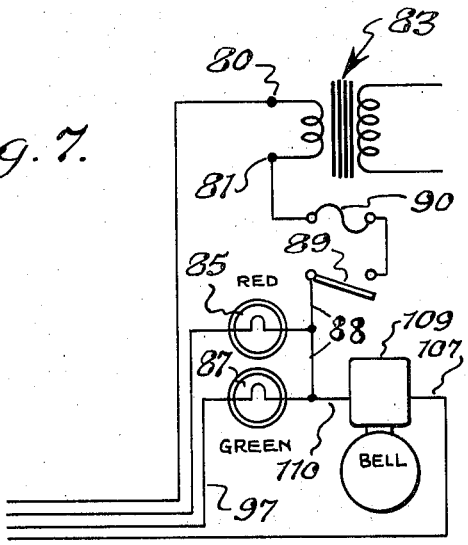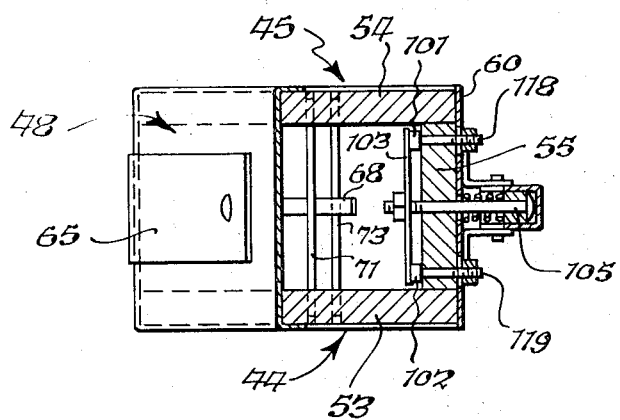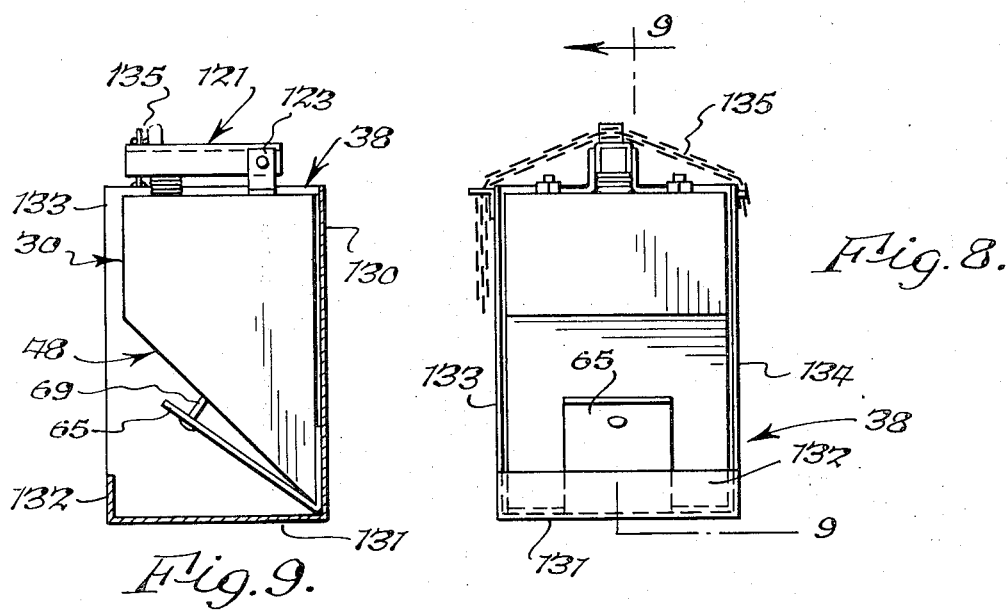

3,824,536

WHEEL BLOCKING ALARM AND INDICATING SYSTEM

BACKGROUND OF THE INVENTION

This invention relates to wheeled land vehicles, and more particularly to a new and improved system for indicating that a wheel of a parked vehicle is safely blocked.

One area of use of the present invention is in loading docks or platforms for wheeled freight carriers, such as trucks and railroad freight cars, although the principles of the invention can be variously applied. When a freight carrier is parked at the platform or dock it is customary to block at least one wheel, such as by means of a blocking wedge or chock placed in blocking engagement between a tire of the truck and the road surface, to prevent dangerous movement of the carrier while workers are moving freight items between the interior of the loading dock and the interior of the carrier.

It is customary to move freight, especially heavy freight items, by means of lift truck vehicles or fork lift trucks driven by a single operator into and out of the interior of the freight carrier. Many fork lift trucks in current use are relatively large and heavy so that if the freight carrier is not properly blocked, as the lift truck is driven from the loading dock into the carrier, it is possible for the weight of the lift truck to cause movement of the carrier away from the dock thereby causing the lift truck and operator to fall between the carrier and dock resulting in a serious accident. Furthermore, the construction of many loading docks does not enable the man operating the fork lift truck to determine visually whether or not the driver of the parked freight carrier has properly blocked the wheel of the carrier as he drives the lift truck from the interior of the dock toward the interior of the freight carrier.

SUMMARY OF THE INVENTION

It is, therefore, an object of this invention to provide a new and improved system for indicating that a wheel of a stationary vehicle is safely blocked against movement.

It is a more particular object of this invention to provide a wheel blocking alarm and indicating system enabling workers inside a freight loading dock or platform to determine readily that a wheel of a freight carrier parked outside the dock is blocked safely against movement.

It is a further object of this invention to provide such a wheel blocking alarm and indicating system for freight loading docks which encourages proper blocking of a wheel of a parked freight carrier once an attempt to block the wheel has been made.

It is a further object of this invention to provide such a wheel blocking alarm and indicating means which is relatively simple in construction and convenient and easy to maintain.

The present invention provides a wheel blocking and indicating system comprising a blocking member adapted to be placed against a vehicle wheel in a manner preventing movement thereof, sensing means on the blocking member and indicating means connected to the sensing means. Safety or alarm indications are provided depending upon whether or not the blocking member is properly placed against the wheel to prevent movement thereof. An alarm also is provided whenever the blocking member is removed from a storage means separate from the blocking member and is not properly placed against the wheel to prevent movement thereof. The indicating means can be located remote from the blocking member such as inside a loading dock for wheeled freight carriers.

The foregoing and additional advantages and characterizing features of the present invention will become clearly apparent from a reading of the ensuing detailed description together with the included drawing wherein:

BRIEF DESCRIPTION OF THE DRAWING FIGURES

FIG. 6 is a plan view similar to FIG. 3, and partly in section;

FIG. 7 is a schematic circuit diagram of the system of the present invention;

FIG. 8 is an elevational view showing the wheel blocking member stored in a receptacle; and FIG. 9 is an elevational view, partly in section, taken about on line 9—9 in FIG. 8.

DETAILED DESCRIPTION OF THE ILLUSTRATED EMBODIMENT

Figure 1:
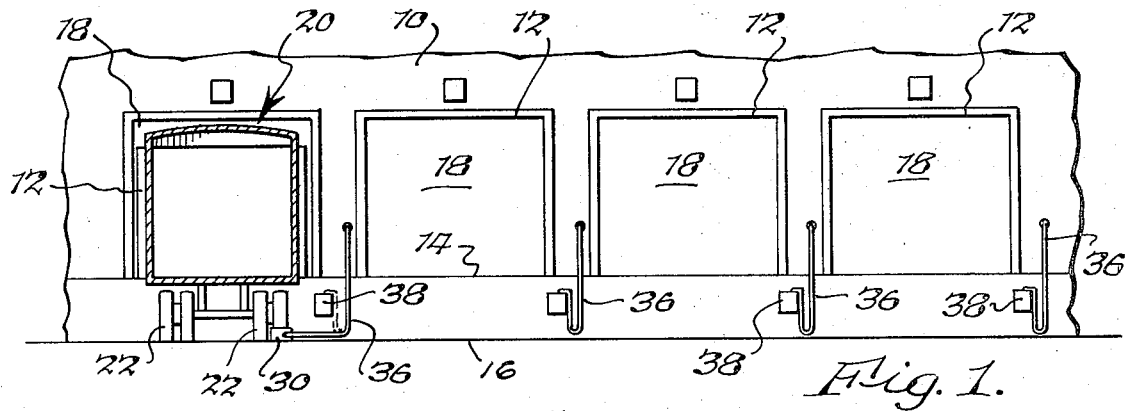
FIG. 1 is a fragmentary elevational view, partly in section, of the exterior of a loading dock for wheeled freight carriers which is provided with the wheel blocking alarm and indicating system of the present invention.
Figure 2:
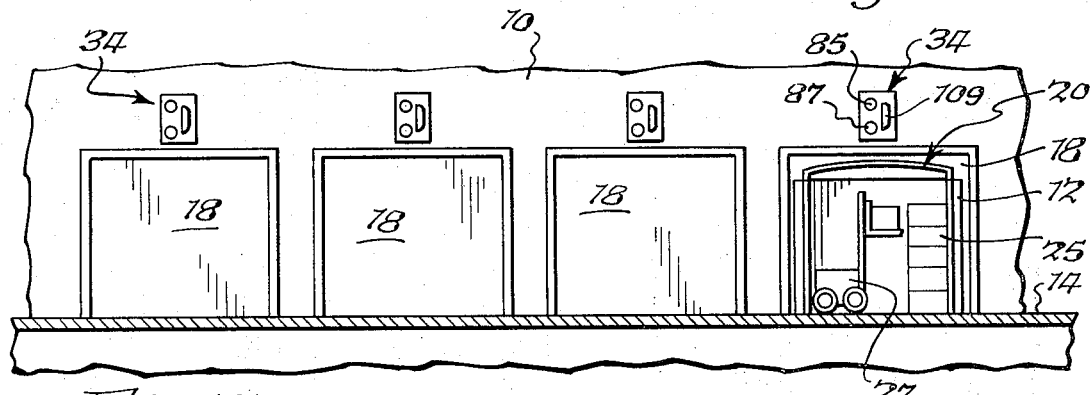
FIG. 2 is a fragmentary elevational view, partly in section, of the interior of the loading dock of FIG. 1.
Figure 3:
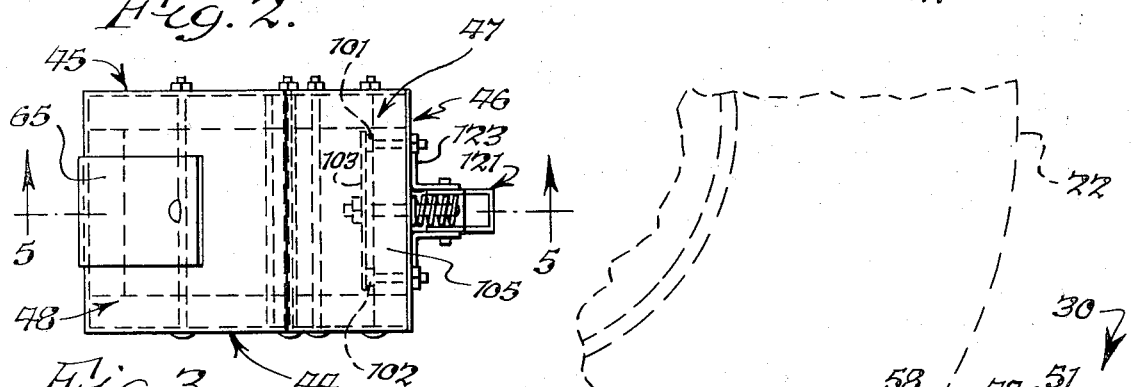
FIG. 3 is a plan view of a wheel blocking member included in the system of the present invention.

FIGS. 1 and 2 show portions of the exterior and interior, respectively, of a loading dock or platform at which wheeled freight carriers such as trucks are parked for loading and unloading freight therefrom. As shown in FIG. 1 the dock has a wall 10 provided with a series of doorways or openings 12 and a floor or platform level 14 which is elevated relative to the level of the adjacent roadway or ground 16. Each passageway 12 preferably has a vertically movable door 18 for opening and closing the same. The left-hand opening 12 as viewed in FIG. 1 has door 18 thereof in an open position to allow movement of freight items between the interior of the loading dock and the interior of a truck 20 parked adjacent the opening 12. In the present illustration truck 20 is backed into position so that the rear end thereof is adjacent opening 12, and when truck 20 is left in this position for loading and unloading the same it is important that a wheel 22 thereof be blocked so as to prevent truck 20 from moving or rolling away from the loading platform. While the foregoing arrangement is preferred in most instances for accommodating a large number of carriers at a loading platform, truck 20 could of course be parked adjacent the loading platform and parallel to wall 10 so that a doorway or opening on the side of the truck is positioned adjacent doorway 12.

FIG. 2 shows the interior of the loading dock or platform of FIG. 1 including wall 10, openings 12, floor 14 and vertically movable doors 18 for closing the openings or passageways 12 when desired. The right-hand opening 12 in FIG. 2 is the same as that seen on the left-hand side of FIG. 1 where truck 20 is parked adjacent opening 12, the door 18 of which is raised to an open position. Items of freight, for example those designated 25 positioned within truck 20, often are moved between the interior of the loading dock or platform and the freight carrier parked adjacent thereto by means of lift trucks or fork-lift trucks, one being shown at 27 in FIG. 2, which are operated by a single person and are of a size permitting them to be driven into and out of the interior of trucks such as that shown at 20. Many fork-lift trucks in current use are relatively large and heavy, so that if a wheel 22 of truck 20 were not properly blocked as the lift truck is driven from the floor 14 of the loading dock into the truck 20, it is possible for the weight of the lift truck to cause movement of the carrier 20 away from the dock thereby causing the lift truck and the operator to fall between the carrier 20 and the dock wall 10 resulting in a serious accident. Loading docks or platforms of the type shown in FIGS. 1 and 2, including a plurality of doorways or passageways 12 in a wall 10, do not enable the man operating a forklift truck inside the dock to determine visually whether or not the driver of the freight carrier 20 parked outside the dock has properly blocked a wheel 22 thereof. This is apparent from an inspection of FIG. 2 wherein a relatively narrow space or opening exists between the walls of truck 20 and the periphery of passage 12 together with the fact that floor 14 of the loading dock or platform is elevated relative to the ground or roadway surface 16.

Figure 5:
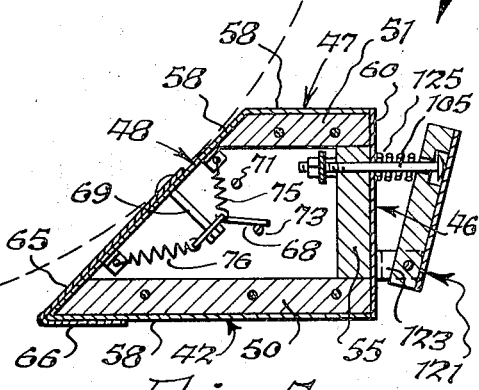
FIG. 5 is a sectional view taken about on line 5—5 in FIG. 3.

According to the present invention there is provided a system for indicating that a wheel of a parked vehicle, for example wheel 22 of truck 20, is properly and safely blocked against movement thereof. The system of the present invention comprises a wheel blocking member 30 adapted to be placed against a vehicle wheel, that is against wheel 22 of truck 20 as shown in FIGS. 1 and 5, in a manner preventing movement of the wheel. The construction of blocking member 30 will be described in detail further on in the specification. Blocking member 30 of the present invention is provided with sensing means thereon and adapted to be contacted by the wheel of the vehicle or carrier. The structure and operation of the sensing means of the present invention will be described in detail further on in the specification. Suffice it to say at this time, the sensing means has a first state when blocking member 30 is not placed against wheel 22 and a second state when the blocking member 30 is placed against wheel 22 in a manner preventing movement thereof.

The system of the present invention further comprises indicating means operatively connected to the sensing means and providing an alarm indication when the sensing means is in the first state and providing an indication of safety when the sensing means is in the second state. As shown in FIG. 2, an indicating means 34 of the present invention is located in the interior of the loading dock or platform, specifically being mounted adjacent the top of the passageway 12 where it is clearly visible by workers inside the dock. The sensing means on the wheel blocking member 30 is operatively connected to indicating means 34 by means in the form of cable 36 shown in FIG. 1. According to a preferred mode of the present invention, indicating means 34 is electrically operated and includes lamps providing visual alarm and safety indications, for example indicating means 34 can include a red colored lamp which is energized when the sensing means on blocking member 30 detects the fact that blocking member 30 is not properly placed in blocking engagement with wheel 22 and a green colored lamp which is energized when the sensing means on blocking member 30 detects the fact that blocking member 30 is positioned in proper blocking engagement with wheel 22 as shown in FIG. 5.

As shown in FIGS. 1 and 2, there is provided a blocking member 30, indicating means 34, and connecting means or cable 36 for each passage or doorway 12 in the loading dock. The system of the present invention further comprises storage means separate from the blocking member 30 for receiving blocking member 30 when it is not in use. In particular, the storage means comprises a receptacle 38 which is mounted in proximity to the exterior of the dock, in particular mounted on the exterior wall or surface of the dock below the level of floor 14 or at any other location making it readily accessible to persons walking on roadway 16 outside the dock. According to the present invention there is provided second sensing means on wheel blocking member 30 and having a first state when blocking member 30 is not received in the storage receptacle 38 and having a second state when blocking member 30 is received in receptacle 38. The system of the present invention further comprises indicating means which is a part of indicating means 34 and connected to the first and second sensing means on wheel member 30 by means of cable 36 in a manner providing an alarm signal when each of the first and second sensing means is in a state indicating that the blocking member is not received in the storage means 38 and is not placed against a wheel in a manner preventing movement thereof. Accordingly, as soon as the driver of a vehicle parked adjacent the dock, such as truck 20, removes blocking member 30 from receptacle 38, an alarm signal occurs until the driver places blocking member 30 into proper blocking engagement with wheel 22 and in a manner detected by the sensing means.

Figure 4:
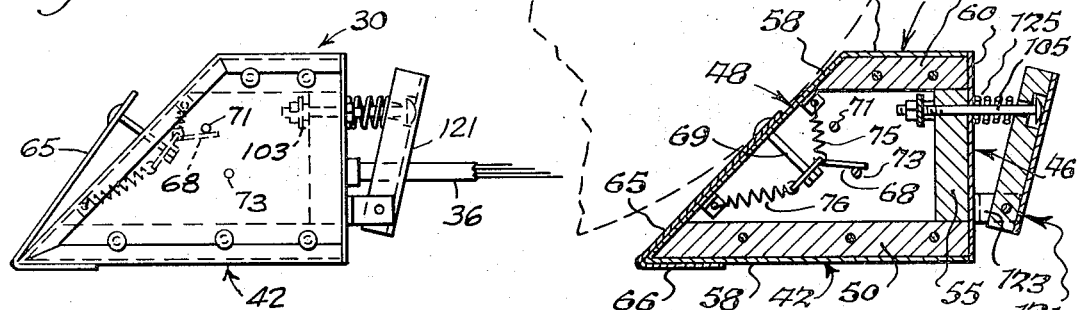
FIG. 4 is a side elevational view of the blocking member of FIG. 3.

Referring now to FIGS. 3–6, wheel blocking member 30 is generally wedge-shaped and comprises a base or bottom member 42, spaced-apart generally vertical sidewalls 44 and 45 each extending at substantially a right angle from base member 42, an end wall 46 extending at substantially a right angle from base member 42 and joining side walls 44, 45 and a top wall member 47 disposed generally parallel to base member 42 and joining sidewalls 44, 45 and end wall 46. Top wall 47 has a length less than that of bottom member 42, in the present illustration the length of top 47 is less than one-half the length of base member 42, and wheel blocking member 30 is completed by a wall 48 joining bottom and top walls 42 and 47, respectively, in a manner defining an inclined or ramp-like wheel contacting surface which is disposed at an acute angle relative to bottom member 42. In preferred form, wheel blocking member 30 is of a construction wherein the walls thereof are provided by relatively thick wood portions and a relatively thin sheet metal exterior covering. As shown in FIGS. 5 and 6, base and top members 42 and 47, respectively, include wooden members 50 and 51, respectively; side walls 44 and 45 include wood members 53 and 54, respectively; and end wall member 46 includes wooden member 55. Members 50 and 51 are of unequal length and each is cut at one end thereof at an angle so as to conform to the desired angle of inclined wheel contacting surface or ramp 48. A sheet of metal can be bent or otherwise formed to provide an exterior metal layer or covering 58 on base 42, top 47 and ramp 48 with flange portions formed to contact portions of the peripheral edges of side walls 44 and 45 as shown in FIGS. 4 and 5. Another sheet metal member 60 can be provided for end wall 46. By way of illustration, in a wheel blocking member 30 constructed according to the present invention, base 42 is about 12 inches long, end wall 46 is about 7 inches high, top 47 is about 4 inches long, ramp 48 defines an angle of about 45° with base 42 and the width of blocking member 30 is about 8 inches. The foregoing description of blocking member 30 illustrates one of various constructions thereof, another of which could be for example a one-piece or integral construction such as molded plastic of sufficient rigidity.

According to a preferred mode of the present invention, the indicating means is electrically operated and the sensing means on wheel blocking member 30 comprises switching means including a switch operator member in the form of a plate 65 movably mechanically connected to wheel blocking member 30 and adapted to be contacted and moved by the vehicle wheel. In particular, operator member 65 comprises a generally rectangular plate bent or otherwise formed adjacent one end to provide a leg portion 66 extending at an acute angle relative to the remaining portion of member 65. Leg portion 66 is attached to the underside of base member 42 by welding or by suitable fastening means. The main body portion of operator member 65 then extends along wheel contacting surface 48 and is flexibly or resiliently movable toward and away from surface 48. Switch operator member 65 is provided with a switch arm portion 68 located within blocking member 30 and connected to one end of a bolt 69, the other end of which is connected to operator member 65 whereby bolt 69 extends through an aperature provided in surface 48. As a result, movements of operator member 65 toward and away from surface 48 produce corresponding movements of arm member 68. The switching means of the present invention further comprises first and second switch contact means 71 and 73, respectively, each of which in the present illustration comprises a metal rod connected at each end in corresponding side wall members 53, 54 and disposed generally perpendicular to the plane of movement of switch arm 68. The switching means also includes biasing means in the form of springs 75, 76 mechanically connected to the combination of switch arm 68 and bolt 69 and to wheel blocking member 30 on the inner surface of wheel contacting surface 48. Biasing means 75, 76 normally urges switch arm 68 into engagement with switch contact means 71 as shown in FIG. 4. As shown in FIG. 5 switch arm 68 is movable against the force of biasing means 75, 76 into engagement with the second switch contact means 73 when operator member 65 is contacted by and moved by vehicle wheel 22. Thus switch contact means or rods 71 and 73 are spaced apart a distance so that a corresponding one is engaged by switch arm 68 when it is in either of the foregoing positions of operation.

A schematic diagram of an electrical circuit including the switching means and indicating means of the present invention is shown in FIG. 7. A pair of input terminals 80, 81 is adapted to be connected to a source of electric current, in the present illustration terminals 80, 81 are connected to the secondary winding of a transformer 83, the primary winding of which is connected to a conventional electrical power supply line in the loading dock or other area where the system of the present invention is being used. The system includes a first electrically operated indicating means for providing an alarm indication in the form of a lamp 85 providing a visual alarm indication such as by virtue of its being colored red or being provided with other suitable alarm indicia. The system includes a second electrically operated indicating means for providing an indication of safety in the form of a lamp 87 providing a visual safety indication such as by virtue of its being colored green or being provided with other suitable safety indicia. One terminal of each of the lamps 85 and 87 is connected to terminal 81 by means of a line 88, a pilot switch 89 and a fuse 90. The other terminal of lamp 85 is connected to terminal 80 when switch arm 68 engages switch contact 71 by means of a line 92, a line 93 connected to switch contact 71 and through a line 95 connecting switch arm 68 to terminal 80. The other terminal of lamp 87 is connected to terminal 80 when switch arm 68 engages switch contact 73 by means of a line 97 connecting lamp 87 to switch contact 73 and a line 95 connecting switch arm 68 to terminal 80.

The second sensing means on wheel blocking member 30 according to the present invention comprises switching means including a pair of switch contact members 101, 102, a switch arm 103 normally engaging contacts 101, 102, and a switch operator member 105 connected to arm 103 for moving the latter into and out of engagement with contacts 101, 102. The switching means has a first state corresponding to the position shown in FIG. 7 when blocking member 30 is not received in storage means 38, and a second state when blocking member 30 is received in storage means 38 as indicated by the broken line position of switch arm 103 shown in FIG. 7. Switch contact 101 is connected by means of a line 107 to one terminal of an electrically operated buzzer or bell 109 or similar audible alarm, the other terminal of which is connected by a line 110 to line 88 and thus to supply terminal 81. Switch contact 102 is connected by a line 112 to one terminal of a flasher 114 or similar electrical signalling device having intermittent or periodic operation, and the other terminal of flasher 114 is connected by a line 116 to the junction of lines 92 and 93.

Referring to FIGS. 5 and 6 switch contacts 101 and 102 can be provided by the heads of bolts or screws 118 and 119, respectively, which are suitably secured in end wall 46. Switch arm 103 can be in the form of an elongated plate or a rod, and operator member 105 comprises a bolt threadably connected in arm 103. The other end of bolt 105 is fixed in a handle member 121 which is pivotally connected at the other end thereof to a bracket member 123 joined to end wall 46. A coil spring 125 positioned on bolt 105 between end wall 46 and handle 121 urges handle 121 away from wall 46 to maintain switch arm 103 normally in contact with or in engagement with switch contacts 101 and 102.

FIGS. 8 and 9 show a preferred form of storage means 38 according to the present invention separate from blocking member 30 for receiving blocking member 30 when it is not in use. Storage means 38 is in the form of a receptacle having an opening for receiving blocking member 30 and comprising an end or back wall portion 130 whereby it can be mounted in proximity to the exterior of the loading dock, for example on the lower portion of wall 10 adjacent opening 12 as shown in FIG. 1, for receiving blocking member 30 when the latter is not in use. The receptacle 38 further comprises a bottom wall portion 131 extending from rear wall 130 at substantially a right angle thereto, an upwardly extending front wall or lip portion 132 and sidewall portions 133, 134 extending from rear wall 130 and joined to bottom wall 131 and front wall 132. The dimension of bottom wall 131 measured along a line perpendicular to rear wall 130 together with the height of front wall 132 are such that when blocking member 130 is placed in receptacle 38, switch operator 65 remains in the position away from surface 48 as shown in FIG. 9. The receptacle is provided with a chain 135 connected to sidewalls 133 and 134 for holding blocking member 30 in the receptacle and for moving handle 121 against the force of spring 125 so that switch arm 103 is moved away from contacts 101, 102 when blocking member 30 is stored in receptacle 38.

The system of the present invention operates in the following manner. When wheel blocking member 30 is not in use, that is when it is not placed in blocking engagement with the wheel of a parked carrier, blocking member 30 is positioned in its storage receptacle 38 as shown in FIGS. 8 and 9 and also in FIG. 1 at the dock openings 12 where no carriers are parked. When blocking member 30 is properly positioned in receptacle 38 with chain 135 holding down handle 121, switch arm 103 is not in engagement with contacts 101, 102 so that flasher 114 and alarm 109 are not energized. Switch operator member 65 is positioned away from surface 48 with switch arm 68 being urged by spring means 75, 76 into engagement with contact 71. As a result, an electrical circuit including warning lamp 85 is completed, and the operation of lamp 85 is readily visible to workers inside the loading dock or platform as is apparent from an inspection of FIG. 2. When a carrier such as truck 20 is parked adjacent the loading dock at one of the openings 12 as shown in FIG. 1, wheel blocking member 30 must be removed from its receptacle 38 and placed in proper blocking engagement with a wheel of the carrier in order to turn off the corresponding red warning light 85 and energize the green light 87 indicating that it is safe for a worker to drive his forklift truck into the interior of the parked carrier or truck.

When the driver of the truck 20 first removed blocking member 30 from receptacle 38, switch arm 68 remains in engagement with contact 71 so that the corresponding red warning light 85 stays on. In addition, the release of chain 135 in removing blocking member 30 from receptacle 38 causes handle 121 to be moved by spring 125 so that switch arm 103 engages contacts 101, 102. As a result, a circuit is completed including flasher 114 and alarm 109. Thus, an audible alarm together with a flashing operation of lamp 85 inside the platform exists so long as blocking member 30 is not secured within receptacle 38 and is not properly positioned in blocking engagement with the wheel 22. The truck driver then must place blocking member 30 properly against wheel 22 in order for the audible alarm to be stopped. In particular, when blocking member 30 is placed against wheel 22 in a manner such that switch operator member 65 is moved into contact with surface 48 as shown in FIG. 5, switch arm 68 is moved away from contact 71 and into engagement with contact 73. The circuit including red warning light 85, alarm 109 and flasher 114 is broken and a circuit including green light 87 is now completed. Only lamp 87 is energized, and this indicates to a worker inside the loading platform that it is safe for him to drive his forklift vehicle into the interior of the parked carrier 20.

It is therefore apparent that the present invention accomplishes its intended objects. There is provided a new and improved system for indicating that a wheel of a stationary vehicle is safely blocked against movement. In particular, wheel blocking member 30 must be wedged properly between a wheel and the ground or road, for example as shown in FIG. 5 with base 42 on the ground or road and surface 48 in blocking engagement with wheel 22 with switch operator member 65 contacted and moved by wheel 22, in order for the sensing means of the present invention to activate the indicating means to provide an indication of safety. Advantageously, the indicating means including lamps 85, 87, buzzer 109 and flasher 114 can be located inside a freight loading dock or platform thereby enabling workers inside the loading dock or platform to determine readily that a wheel of a freight carrier parked outside the dock is blocked safely against movement by wheel blocking member 30. Once wheel blocking member 30 is removed from storage means 38 this is detected by the second sensing means including switch arm 103 and contacts 101, 102 to complete a circuit including lamp 85, buzzer 109 and flasher 114. In order to stop this alarm indication, one must place wheel blocking member 30 in proper blocking engagement with wheel 22 as shown in FIG. 5. The foregoing is provided by apparatus which is relatively simple in construction and convenient and easy to install and maintain.

I claim:

1. In combination with a loading dock for wheeled freight carriers wherein freight is moved between the interior of the dock and the interior of a carrier parked at the dock by lift truck vehicles which are driven into and out of the interior of the parked carrier, a wheel blocking and indicating system comprising:
    a. a blocking member adapted to be placed against a wheel of a freight carrier parked at said dock in a manner preventing movement of the carrier;
    b. sensing means on said blocking member and adapted to be contacted by the wheel of the carrier, said sensing means having a first state when said blocking member is not placed against the wheel and a second state when said blocking member is placed against the wheel in a manner preventing movement thereof;
    c. indicating means located in the interior of said dock and including means for providing an alarm signal to indicate that said blocking member is not placed against the wheel and means for providing a safety signal to indicate that said blocking member is placed against the wheel in a manner preventing movement thereof;
    d. means connecting said sensing means to said indicating means whereby said indicating means provides an alarm signal when said sensing means is in the first state and provides a safety signal when said sensing means is in the second state.

2. A combination according to claim 1 further including:
   a. storage means mounted in proximity to the exterior of said dock for receiving said blocking member when it is not in use;
   b. another sensing means on said blocking member and having a first state when said blocking member is not received by said storage means and a second state when said blocking member is received by said storage means;
   c. second indicating means located in the interior of said dock; and
   d. means connecting both of said sensing means to said second indicating means whereby said second indicating means provides an alarm signal when both of said sensing means are in said first state when said blocking member is not received by said storage means and is not placed against the wheel in a manner preventing movement thereof.

3. A combination according to claim 2 wherein said second indicating means is electrically operated, said connecting means comprises cable means, and said other sensing means comprises switching means coupled to said first sensing means adapted to be contacted by the vehicle wheel and in controlling relation to said second indicating means whereby said second indicating means provides an alarm signal when said sensing means adapted to be contacted by the vehicle wheel is in said first state and said switching means is in said first state when said blocking member is not received by said storage means and is not placed against the wheel in a manner preventing movement thereof.

4. In combination with a loading dock for wheeled freight carriers wherein freight is moved between the interior of the dock and the interior of a carrier parked at the dock by lift truck vehicles which are driven into and out of the interior of the parked carrier, a wheel blocking and indicating system comprising:
   a. a blocking member adapted to be placed against a wheel of a freight carrier parked at said dock in a manner preventing movement of the carrier;
   b. sensing means comprising switching means on said blocking member and adapted to be contacted by the wheel of the carrier, said switching means having a first state when said blocking member is not placed against the wheel and a second state when said blocking member is placed against the wheel in a manner preventing movement thereof;
   c. electrically operated indicating means located in the interior of said dock; and
   d. cable means connecting said switching means in controlling relation to said indicating means whereby when said switching means is in said first state said indicating means provides said alarm signal and when said switching means is in said second state said indicating means provides said safety signal.

5. A vehicle wheel blocking and indicating system comprising:
   a. a blocking member adapted to be placed against a vehicle wheel in a manner preventing movement thereof;
   b. sensing means on said blocking member and adapted to be contacted by the vehicle wheel, said sensing means having a first state when said blocking member is not placed against the wheel and a second state when said blocking member is placed against the wheel in a manner preventing movement thereof;
   c. indicating means operatively connected to said sensing means and comprising a pair of terminals adaptd to be connected to a source of electric current, a first electrically operated indicating means comprising a lamp providing a visual alarm indication when said sensing means is in the first state, a second electrically operated indicating means comprising a lamp providing a visual indication of safety when said sensing means is in the second state, and means connecting one terminal of said pair of terminals to each of said first and second electrically operated indicating means; and
   d. said sensing means comprising switching means connecting the other terminal of said pair of terminals to said first electrically operated indicating means in said first state of said sensing means and to said second electrically operated indicating means in said second state of said sensing means.

6. A vehicle wheel blocking and indicating system comprising:
   a. a blocking member adapted to be placed against a vehicle wheel in a manner preventing movement thereof;
   b. sensing means on said blocking member and adapted to be contacted by the vehicle wheel, said sensing means having a first state when said blocking member is not placed against the wheel and a second state when said blocking member is placed against the wheel in a manner preventing movement thereof;
   c. indicating means operatively connected to said sensing means and comprising a pair of terminals adapted to be connected to a source of electric current, a first electrically operated indicating means for providing an alarm indication, a second electrically operated indicating means for providing an indication of safety, and means connecting one terminal of said pair of terminals to each of said first and second electrically operated indicating means;
   d. said sensing means comprising switching means connecting the other terminal of said pair of terminals to said first electrically operated indicating means in said first state of said sensing means and to said second electrically operated indicating means in said second state of said sensing means;
   e. storage means separate from said blocking member for receiving said blocking member when it is not in use;
   f. another switching means on said blocking member and having a first switching state when said blocking member is not received by said storage means and a second switching state when said blocking member is received by said storage means; and
   g. indicating means connected to both of said switching means and providing an alarm indication when both of said switching means are in the first state thereof when said blocking member is not received by said storage means and is not placed against the wheel in a manner preventing movement thereof, said indicating means comprising electrically operated alarm means for providing an audible alarm indication and electrically operated signalling means having intermittent operation.

7. A vehicle wheel blocking and indicating system comprising:
   a. a blocking member adapted to be placed against a vehicle wheel in a manner preventing movment thereof;
   b. sensing means on said blocking member and adapted to be contacted by the vehicle wheel, said sensing means having a first state when said blocking member is not placed against the wheel and a second state when said blocking member is placed against the wheel in a manner preventing movement thereof;
   c. indicating means operatively connected to said sensing means and including means for providing an alarm indication when said sensing means is in the first state and means for providing an indication of safety when said sensing means is in the second state;
   d. storage means separate from said blocking member for receiving said blocking member when it is not in use;
   e. another sensing means on said blocking member and having a first state when said blocking member is not received by said storage means and a second state when said blocking member is received by said storage means; and
   f. indicating means operatively connected to both of said sensing means and providing an alarm indication when said blocking member is not received by said storage means and is not placed against the wheel in a manner preventing movement thereof.

8. A vehicle wheel blocking and indicating system comprising:
   a. a blocking member adapted to be placed against a vehicle wheel in a manner preventing movement thereof;
   b. sensing means on said blocking member and adapted to be contacted by the vehicle wheel, said sensing means having a first state when said blocking member is not placed against the wheel and a second state when said blocking member is placed against the wheel in a manner preventing movement thereof;
   c. indicating means operatively connected to said sensing means and including means for providing an alarm indication when said sensing means in in the first state and means for providing an indication of safety when said sensing means is in the second state, said indicating means comprising a pair of terminals adapted to be connected to a source of electric current, first electrically operated indicating means for providing an alarm indication, second electrically operated indicating means for providing an indication of safety, and means connecting one terminal of said pair of terminals to each of said alarm indicating means and safety indicating means; and
   d. said sensing means comprising switching means connecting the other terminal of said pair of terminals to said first electrically operated indicating means in said first state of said sensing means and to said second electrically operated indicating means in said second state of said sensing means.

9. Apparatus according to claim 8, wherein said switching means comprises:
   a. a switch arm movably mechanically connected to said blocking member and adapted to be contacted and moved by the vehicle wheel;
   b. means connecting said switch arm to the other terminal of said pair of terminals;
   c. first and second contact means connected to said first and second electrically operated indicating means, respectively; and
   d. biasing means mechanically connected to said switch arm and said blocking member, said biasing means normally urging said switch arm into engagement with said first switch contact means and said switch arm being movable against said biasing means and into engagement with said second switch contact means when contacted and moved by the vehicle wheel.

10. Apparatus according to claim 8 further including:
    a. storage means separate from said blocking member for receiving said blocking member when it is not in use;
    b. another switching means on said blocking member and having a first switching state when said blocking member is not received by said storage means; and
    c. indicating means connected to both of said switching means and providing an alarm indication when both of said switching means are in the first state thereof when said blocking member is not received by said storage means and is not placed against the wheel in a manner preventing movement thereof.

11. Apparatus according to claim 8, wherein said wheel blocking member has a base member and a wheel contacting surface member extending at an acute angle to said base member and wherein said sensing means is on said wheel contacting surface member whereby when said wheel blocking member is wedged between the vehicle wheel and the ground to prevent movement of the wheel, said sensing means is in the second state.

* * * * *